June 16, 1925.

A. W. KLUG

FLAG BRACKET

Filed Aug. 9, 1924

1,542,458

Inventor
Alfred W. Klug

Patented June 16, 1925.

1,542,458

UNITED STATES PATENT OFFICE.

ALFRED W. KLUG, OF MILWAUKEE, WISCONSIN.

FLAG BRACKET.

Application filed August 9, 1924. Serial No. 731,096.

*To all whom it may concern:*

Be it known that I, ALFRED W. KLUG, a citizen of the United States, and resident of Milwaukee, in the county of Milwaukee and State of Wisconsin, have invented certain new and useful Improvements in Flag Brackets; and I do hereby declare that the following is a full, clear, and exact description thereof.

This invention relates to an improvement in flag brackets for mounting upon motor vehicles and the like.

The primary object of the present invention is to provide a simple inexpensive bracket for holding the staff of a flag or other emblem, and which is capable of attachment to various parts of a vehicle or the like, eliminating the necessity of screws, clamps, and various other securing means.

A more specific object is to provide a device of the foregoing character designed to securely engage parts of a conventional automobile lamp, or headlight.

With the above and other objects in view, which will appear as the description proceeds, the invention resides in the novel construction, combination and arrangement of parts substantially as hereinafter described and more particularly defined by the appended claim, it being understood that such changes in the precise embodiment of the herein disclosed invention may be made as come within the scope of the claim.

In the accompanying drawing is illustrated one complete example of the physical embodiment of the present invention constructed according to the best mode so far devised for the practical application of the principles thereof.

Figure 1:
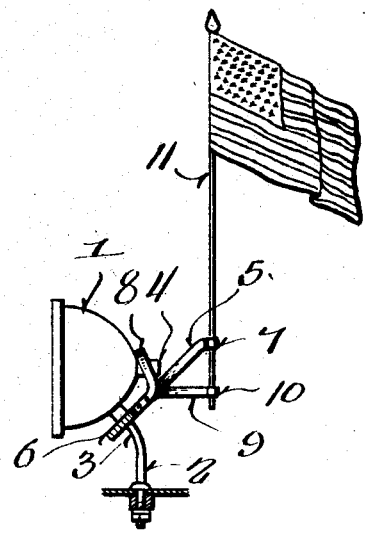
Figure 1 is an elevational view of the invention mounted upon an automobile headlight.
Figure 2:
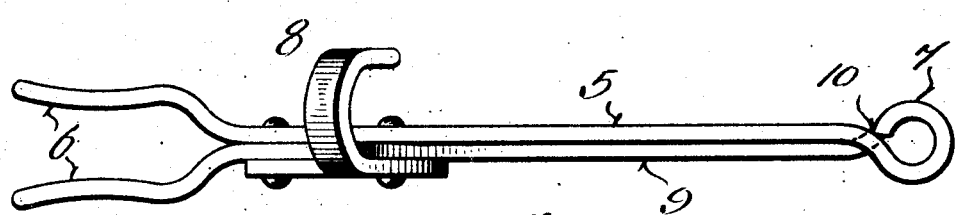
Figure 2 is an enlarged plan view of the same.

Referring now more particularly to the accompanying drawings, the numeral 1 designates a conventional type of automobile headlight which is supported upon the post 2 having an angular offset portion 3. The headlight 1 is further provided with a rearwardly extending socket connection 4 adapted to receive the conventional wiring.

The present invention is particularly designed for attachment to a lamp assembly of the foregoing character and comprises a main arm 5, the lower end of which is provided with a pair of forked members 6 adapted to straddle the angular portion 3 of the lamp post 2. The upper end of the arm 5 is bent to form a loop 7 which is angularly offset with relation to said arm.

Projecting upwardly from the arm 5 and secured thereto in any suitable manner is a hook 8 which passes over and engages the socket extension 4. Thus it will be seen that the arm 5 is supported in an angular position by means of its lower forked end straddling the portion 3 of the lamp post, and the hook 8 engaging the socket 4.

Extending rearwardly from the arm 5 is a second arm 9 which has its free end rolled to form a loop 10, which loop is in alignment with the loop 7 and cooperates therewith to retain the staff 11 which may carry a flag or other emblem.

While in the present illustration of my invention I have shown the same constructed of stock material in the form of strap iron, it will be appreciated that the same may be cast or constructed in various other ways without departing from the invention.

It will further be seen that a bracket constructed in accordance with the foregoing may be quickly attached or removed from a conventional lamp assembly, without any mechanical operation, inasmuch as clamps and other securing means ordinarily used are eliminated.

I claim:

A device of the character described comprising an arm provided with forked members at its lower end for straddling the post of a lamp, a loop at its upper end, a hook projecting upwardly from said arm for engaging the socket of the lamp, a second arm carried by the first arm, and a loop carried by the free end of said second arm and cooperating with the first mentioned loop for holding the staff of a flag or other emblem.

In testimony that I claim the foregoing I have hereunto set my hand at Milwaukee, in the county of Milwaukee and State of Wisconsin.

ALFRED W. KLUG.